(12) United States Patent
Vinke et al.

(10) Patent No.: US 11,420,752 B2
(45) Date of Patent: Aug. 23, 2022

(54) AIRCRAFT WITH A FUSELAGE THAT COMPRISES AT LEAST ONE HOLLOW BEAM ELEMENT

(71) Applicant: AIRBUS HELICOPTERS DEUTSCHLAND GMBH, Donauworth (DE)

(72) Inventors: Chris Vinke, Oberndorf-am-Lech (DE); Petr Schejbal, Munich (DE); Daniel Haase, Rain (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 1065 days.

(21) Appl. No.: 15/928,297

(22) Filed: Mar. 22, 2018

(65) Prior Publication Data

US 2018/0273187 A1    Sep. 27, 2018

(30) Foreign Application Priority Data

Mar. 22, 2017   (EP) ..................................... 17400015

(51) Int. Cl.
*B64D 13/00*  (2006.01)
*B64D 13/06*  (2006.01)
(Continued)

(52) U.S. Cl.
CPC ................ *B64D 13/06* (2013.01); *B64C 1/06* (2013.01); *B64C 27/04* (2013.01); *B64D 13/08* (2013.01);
(Continued)

(58) Field of Classification Search
CPC ........... B64C 27/04; B64C 1/06; B64C 1/061; B64D 2013/0603; B64D 13/06;
(Continued)

(56) References Cited

U.S. PATENT DOCUMENTS 3,028,292 A * 4/1962 Hinds .................. B29D 24/008
156/214
3,343,250 A * 9/1967 Goforth ................... B21D 9/16
29/423

(Continued)

FOREIGN PATENT DOCUMENTS

EP    2979975 A1    2/2016
WO    2012101439 A1    8/2012

OTHER PUBLICATIONS

European Office Action dated Dec. 8, 2020, Application No. 17 400 015.8—1010, Applicant Airbus Helicopters Deutschland GmbH, 5 Pages.

(Continued)

*Primary Examiner* — Phutthiwat Wongwian
*Assistant Examiner* — Sherman D Manley
(74) *Attorney, Agent, or Firm* — Brooks Kushman P.C.

(57) ABSTRACT

An aircraft with a fuselage that comprises at least one hollow beam element, wherein the at least one hollow beam element accommodates at least one hollow duct element that comprises a tubular duct element wall, and wherein at least one protective spacer is arranged between the tubular duct element wall and the at least one hollow beam element such that free space is available between the tubular duct element wall and the at least one hollow beam element.

20 Claims, 7 Drawing Sheets

(51) Int. Cl.
*B64C 27/04* (2006.01)
*B64F 1/36* (2017.01)
*B64D 13/08* (2006.01)
*F16L 3/00* (2006.01)
*B64C 1/06* (2006.01)

(52) U.S. Cl.
CPC ............... *B64F 1/362* (2013.01); *F16L 3/00* (2013.01); *B64D 2013/0603* (2013.01); *Y02T 50/40* (2013.01); *Y02T 50/50* (2013.01); *Y02T 50/80* (2013.01)

(58) Field of Classification Search
CPC ......... B64D 13/08; B64D 13/00; B64F 1/362; F16L 3/00; Y02T 50/40; Y02T 50/50; Y02T 50/80
See application file for complete search history.

(56) References Cited

U.S. PATENT DOCUMENTS

| | | | | |
|---|---|---|---|---|
| 3,390,393 | A * | 6/1968 | Upton | H01Q 1/286 343/708 |
| 4,053,126 | A * | 10/1977 | Duret | B29C 70/26 244/119 |
| 4,863,771 | A * | 9/1989 | Freeman | B29C 70/443 428/36.1 |
| 5,037,041 | A * | 8/1991 | Unterhitzenberger | B64C 1/00 244/120 |
| 5,171,510 | A * | 12/1992 | Barquet | B29C 70/461 264/258 |
| 5,562,264 | A * | 10/1996 | Bietenhader | B64C 1/06 244/120 |
| 7,810,756 | B2 * | 10/2010 | Alby | B64C 1/26 244/119 |
| 7,942,369 | B2 * | 5/2011 | Mahieu | B64C 1/1476 244/129.3 |
| 8,377,248 | B2 * | 2/2013 | Coleman | B29C 70/443 156/287 |
| 9,297,550 | B2 * | 3/2016 | Fanelli | F24F 13/0245 |
| 9,873,512 | B2 * | 1/2018 | Mores | B64D 13/06 |
| 10,023,321 | B1 * | 7/2018 | Oyzerskiy | B64C 3/182 |
| 2003/0042364 | A1 * | 3/2003 | Tanaka | B64F 5/10 244/123.2 |
| 2004/0214519 | A1 | 10/2004 | Nogueira et al. | |
| 2005/0211839 | A1 * | 9/2005 | Movsesian | B32B 19/045 244/119 |
| 2005/0211843 | A1 * | 9/2005 | Simpson | B29C 70/342 244/119 |
| 2005/0230552 | A1 * | 10/2005 | Engwall | B29C 33/485 244/133 |
| 2007/0095982 | A1 * | 5/2007 | Kismarton | B64C 1/12 244/119 |
| 2007/0200031 | A1 | 8/2007 | Deharde et al. | |
| 2008/0111024 | A1 * | 5/2008 | Lee | B64C 1/068 244/121 |
| 2008/0173758 | A1 * | 7/2008 | Benthien | B64D 9/00 244/119 |
| 2008/0290214 | A1 * | 11/2008 | Guzman | B64C 3/182 244/119 |
| 2009/0194636 | A1 * | 8/2009 | Childs | B64C 3/182 244/123.8 |
| 2009/0260706 | A1 | 10/2009 | Hesse et al. | |
| 2009/0283638 | A1 * | 11/2009 | Arevalo Rodriguez | B29D 99/0014 244/119 |
| 2010/0087131 | A1 | 4/2010 | Stuetzer et al. | |
| 2010/0148003 | A1 * | 6/2010 | Verweyen | B64D 13/00 244/119 |
| 2010/0230542 | A1 * | 9/2010 | Childs | B64C 3/182 244/123.1 |
| 2010/0318243 | A1 * | 12/2010 | Lewis | B64C 1/18 701/3 |
| 2011/0027526 | A1 * | 2/2011 | McCarville | B29C 70/30 428/116 |
| 2012/0248244 | A1 * | 10/2012 | Brownjohn | B64C 1/061 244/118.5 |
| 2013/0312865 | A1 * | 11/2013 | Baur | F16L 9/18 138/148 |
| 2015/0053820 | A1 | 2/2015 | Napp | |

OTHER PUBLICATIONS

European Search Report for European Application No. EP 1740015, dated Sep. 18, 2017, 7 pages.

* cited by examiner

AIRCRAFT WITH A FUSELAGE THAT COMPRISES AT LEAST ONE HOLLOW BEAM ELEMENT

CROSS-REFERENCE TO RELATED APPLICATIONS

This application claims priority to European patent application No. EP 17400015.8 filed on Mar. 22, 2017, the disclosure of which is incorporated in its entirety by reference herein.

BACKGROUND OF THE INVENTION

(1) Field of the Invention

The invention is related to an aircraft with a fuselage that comprises at least one hollow beam element, wherein the at least one hollow beam element accommodates at least one hollow duct element that comprises a tubular duct element wall.

2) Description of Related Art

A fuselage of an aircraft, and in particular of a rotorcraft, can at least partly be provided with a framework structure having one or more hollow frames in order to reduce an overall weight of the fuselage. Such hollow frames may consist of a plurality of hollow beam elements that are separately manufactured and subsequently assembled to define the framework structure. To this end, the separate hollow beam elements are interconnected during assembly at corresponding intersection points by means of suitable joints.

The document U.S. Pat. No. 5,037,041 A describes such a framework structure having several hollow frames. More specifically, these hollow frames define a cockpit frame for a helicopter.

The hollow frames can be used for implementation of a basic ventilation system and an environmental control system, and can further be used with an air ventilation and/or conditioning system. All these systems together have constituent parts and/or components that produce a flow of air at a specific spot in or on the aircraft, which is usually not the spot where the air should be expelled to cool or heat a certain region of the aircraft, such as its cockpit, or a selected component, such as a main window in the cockpit, or a person, such as the pilot of the aircraft.

Aircraft ventilation and/or air conditioning systems generally consist of air generating components, which generate an air stream, e. g. pumps, fans and/or compressors, and of air ducts, which are implemented into the aircraft and, at least partly, accommodated in its fuselage in order to direct the generated air stream to a given region where it is expelled. The air ducts are usually realized by means of flexible hoses, tubes and/or pipes that are mounted to the fuselage and, thus, integrated into the aircraft volume.

However, such flexible hoses, tubes and/or pipes require a certain installation space that must be allocated and reserved in the aircraft. This installation space cannot be used for other purposes and, thus, further reduces an already limited available space in the aircraft.

Furthermore, such flexible hoses, tubes and/or pipes are frequently routed along the fuselage or available guidance components and, therefore, only on their outside covered by linings. If the fuselage is used as routing guidance, this is normally only performed for very short distances, e. g. 30 cm to 50 cm, such that accessibility and fixation of such flexible hoses, tubes and/or pipes is normally feasible.

By way of example, the document US 2010/0087131 A1 describes an aircraft with air ducts that are at least partly implemented by means of dedicated tubes. These dedicated tubes are used to define air guide elements for connecting the air ducts that are bounded between overhead luggage compartment housing back walls and personal service ducts to a line system of an aircraft air conditioning system.

This aircraft air conditioning system, however, requires a comparatively large number of interconnected components. Accordingly, assembly of the aircraft air conditioning system is time-consuming and, therefore, expensive. Furthermore, due to the comparatively large number of interconnected components, this aircraft air conditioning system is prone to air leakage, leading to a reduced overall performance of the system.

In contrast thereto, the document US 2012/0248244 A1 describes a fuselage of an aircraft that is formed by load-bearing hollow structural elements, which are defined by longitudinal frames, which are also referred to as stringers, and transverse frames, as well as transverse beams. The stringers, transverse frames and transverse beams are interconnected at associated intersecting points to build up a lattice structure that is covered by an outer skin, thereby defining the shape of the fuselage. Furthermore, air ducts are integrated into the interconnected stringers, transverse frames and transverse beams and adapted to transport air for air conditioning purposes from an air conditioning system into a passenger compartment of the aircraft. Each such air duct is provided with one or more variable control valves for controlling respective flow cross sections of the air ducts, i. e. for controlling respective air flows and/or air pressures in the air ducts. Moreover, actuators such as pivoting flaps for controlling how an air stream is to be carried are provided in one or more of the intersecting points.

This lattice structure advantageously allows implementing an air conditioning system in a fuselage of an aircraft without requiring use of the above described flexible hoses, tubes and/or pipes. Thus, the installation space that would normally be required for these flexible hoses, tubes and/or pipes can be saved for other purposes.

However, the intersecting points where the stringers, transverse frames and transverse beams are respectively interconnected are prone to air leakage, as they would normally not fit perfectly to each other due to underlying manufacturing tolerances. Accordingly, the generated air stream that moves e. g. from an air duct in a stringer via an intersecting point into a transvers frame or transverse beam would potentially leak at the intersecting point, therefore limiting the overall achievable performance of the air conditioning system. Furthermore, this lattice structure is not suitable for implementing an air conditioning or ventilating system in an aircraft with reduced installation space requirements permitting its installation e. g. in a cockpit region of the aircraft, which inherently exhibits only limited available space and which is structurally a very complex region, where generally no interconnectable stringers, transverse frames and/or transverse beams exist.

The document US 2011/027526 A1 describes a fuselage skin of an aircraft that is similarly provided with stringers. However, in this case the stringers are implemented with foam-stiffened hollow cores, which are formed by a filler material and a barrier material. The filler material and the barrier material define a channel that can be used as air duct. Both are laid up with a composite material onto a tool in a shape of a composite structure that is to be created and the composite material and the filler material are cured together in the shape of the composite structure.

However, a major challenge with this composite structure is reparability of such an air duct once the composite structure is cured, e. g. when the filler material is damaged. Furthermore, the filler material must be protected from any rivets, anchor nuts and/or other protruding parts, which may subsequently be mounted to the composite structure.

The document EP 2 979 975 A1 describes an aircraft with a fuselage that comprises a framework structure having at least one hollow frame. The at least one hollow frame is integrally formed in one piece and comprises fiber reinforced polymers. Furthermore, the at least one hollow frame defines an integrated ventilation air duct that is adapted for guiding ventilation air into said aircraft. The at least one hollow frame is at least partly provided, i. e. lined, with an inner air duct insulation for insulating the integrated ventilation air duct.

However, providing a hollow frame that is integrally formed in one piece and comprises fiber reinforced polymers generally requires blow molding of the hollow frame, which usually leads to resin residues remaining inside of the hollow frame, thus, making its inner surface rough and unsuitable for many sorts of installations. Furthermore, while not explicitly described in the document EP 2 979 975 A1, lining of the hollow frame with the inner air duct insulation requires introduction of a respective lining material into the hollow frame, which needs to be performed after the blow molded hollow frame is cured, as inserting and fixing the lining material prior to curing is generally not feasible.

In particular cases, comparatively small tubes may be installed in a blow molded hollow frame using dedicated anchor nuts or click-bonds. This, however, adds weight and installing these parts in a closed walled structure is time consuming. Furthermore, it must be ensured that any rivets and/or anchor nuts arranged inside of the blow molded hollow frame do not damage the small tubes during installation and during subsequent operation.

Finally, another challenge that must be considered is reparability and exchangeability of such small tubes once installed. Conventional installation techniques require some sort of permanent fixation making replacement repairs relatively challenging.

BRIEF SUMMARY OF THE INVENTION

It is, therefore, an object of the present invention to provide a new aircraft with a fuselage that comprises at least one hollow beam element, which accommodates at least one hollow duct element that can easily be installed, exchanged and repaired.

This object is solved by an aircraft that comprises the features of claim 1. More specifically, according to the invention an aircraft with a fuselage that comprises at least one hollow beam element, wherein the at least one hollow beam element accommodates at least one hollow duct element that comprises a tubular duct element wall is provided. At least one protective spacer is arranged between the tubular duct element wall and the at least one hollow beam element such that free space is available between the tubular duct element wall and the at least one hollow beam element.

Advantageously, inserting the at least one hollow duct element into the at least one hollow beam element allows to economize additional fasteners and fixation means, which are otherwise required for e. g. fixation of dedicated flexible hoses, tubes and/or pipes to the fuselage. This enable a reduction of an overall weight of the aircraft.

According to one aspect, a ventilation system of an aircraft is implemented into one or more basic frames of the aircraft in order to provide sufficient air to various regions of the aircraft. To this end, the inventive fuselage and, more specifically, the one or more basic frames preferably comprise at least one hollow beam element that accommodates at least one hollow duct element which is equipped with a tubular duct element wall, wherein the at least one hollow duct element is used for air ducting. The at least one hollow beam element and the at least one hollow duct element may preferably be provided with slots and/or vents and/or adjustable nozzles through which air can be expelled onto a window or passenger/pilot or electronic component of a given aircraft.

The air is preferably generated by a system which creates an air advection, e. g. a pump, fan, compressor, etc., which is commonly referred to as a ventilation system. This ventilation system could also include an environmental control system or an air-conditioning system.

Correspondingly generated air, which is introduced into the at least one hollow beam element and, more particularly, into the at least one hollow duct element of the fuselage, is ducted in an air tight cross-section of the at least one hollow duct element until defined air outlets expel the ducted air in order to provide a window, pilot, passenger and/or component of the aircraft with hot or cold air. A hot air supply can advantageously be used to support preconditioning, i. e. heating up, of aircraft components, such as the fuel system, the oil system, electrical components, e. g. computers, fuse boxes and so on, and/or mechanical components, e. g. gear boxes, engines and so on.

More specifically, the at least one hollow duct element is advantageously used for hot and cold air ducting, so that a reduced aircraft volume usage can be achieved due to a double usage of the at least one hollow beam element, so that more space can be allocated for other aircraft items and components. Moreover, an improved pilots and/or passenger ventilation can be achieved since the at least one hollow beam element is usually located nearby.

Furthermore, the at least one hollow duct element is particularly advantageous when being provided with air generated from a heating or a cooling machine in order to guide hot or cold air, as this will lead to temperature variations with respect to corresponding outside environmental conditions of the aircraft. In this case, the at least one hollow duct element and the free space that is available between the tubular duct element wall of the at least one hollow duct element and the at least one hollow beam element will function as an isolation for the guided hot or cold air with respect to the at least one hollow beam element. More specifically, the at least one hollow duct element and the free space prevent warm air to dissipate heat over the at least one hollow beam element to the outside ambient air when hot air is guided in the at least one hollow duct element. Likewise, retrieval of heat from the ambient air is prevented when the at least one hollow duct element guides cold air.

Moreover, an overall weight of the aircraft can be reduced as the use of dedicated flexible hoses, tubes and/or pipes can be omitted, at least essentially. This omission also reduces maintenance costs, since breakage, rupture and/or abrasion of such dedicated flexible hoses, tubes and/or pipes will be avoided.

Advantageously, the at least one hollow duct element can be combined with an existing air intake geometry of the aircraft for de-icing or anti-icing. Thus, an improved de-icing performance and similarly an improved de-misting and/or de-fogging performance can be achieved due to an improved integration of corresponding air outlets close to the aircraft windows. This also increases safety and customer satisfaction since the aircraft windows are better and quicker de-iced, de-misted and/or de-fogged. Moreover, since de-icing and/or de-misting performances are improved, respective on-ground times before flight can be shortened advantageously, thus, resulting in reduced fuel consumption.

According to a preferred embodiment, the tubular duct element wall and the at least one protective spacer are integrally formed as a single piece.

It should be noted that in the context of the present invention the term "integrally formed in one piece" refers to a component that is manufactured as one single element and that cannot be split into two or more separate parts in a non-destructive manner. In other words, the tubular duct element wall and the at least one protective spacer can only be split into two or more separate parts by means of destructive measures, such as e. g. sawing, cutting or breaking.

According to a further preferred embodiment, at least the tubular duct element wall comprises polyvinylidene fluoride.

According to a further preferred embodiment, the at least one protective spacer comprises polyvinylidene fluoride.

According to a further preferred embodiment, the at least one protective spacer is provided as an external protrusion of the tubular duct element wall.

According to a further preferred embodiment, the at least one hollow beam element is a blow molded composite structure that is integrally formed as a single piece.

As already noted above, in the context of the present invention the term "integrally formed in one piece" refers to a component that is manufactured as one single element and that cannot be split into two or more separate parts in a non-destructive manner. That means with respect to the at least one hollow beam element that, similar to the tubular duct element wall and the at least one protective spacer, the at least one hollow beam element can only be split into two or more separate parts by means of destructive measures, such as e. g. sawing, cutting or breaking.

Preferably, the blow molded composite structure is formed with fiber reinforced polymers that comprise carbon fiber reinforced polymers. However, it should be noted that such carbon fiber reinforced polymers are merely described by way of example and not for limiting the present invention thereto. Instead, other fiber reinforced polymers can likewise be applied, such as e.g. glass fiber reinforced polymers, basalt fiber reinforced polymers and/or aramid fiber reinforced polymers.

According to one aspect, foam stripes such as e. g. open cell foam stripes are arranged and fixed, e. g. using a suitable adhesive, on an inside of the blow molded composite structure, prior to introducing the at least one hollow duct element into the at least one hollow beam element. These foam stripes preferably act as protective spacers for spacing apart the at least one hollow duct element from the at least one hollow beam element, thus, protecting the at least one hollow duct element e. g. against resin residues, rivets and/or anchor nuts in the at least one hollow beam element. At the same time, the foam stripes are preferably used as pressure surfaces on the at least one hollow duct element such that it stays in position in the at least one hollow beam element.

According to another aspect, the foam stripes are directly bonded on the at least one hollow duct element, which is subsequently introduced into the at least one hollow beam element. In this case, the foam stripes are preferably positioned such that they only limitedly interfere with obstacles inside the blow molded composite structure, such as e. g. resin residues, rivets and anchor nuts.

According to still another aspect, the above described two aspects are combined. Accordingly, a first part of the foam stripes is arranged and fixed on an inside of the blow molded composite structure, while another part of the foam stripes is directly bonded on the at least one hollow duct element.

In any case, the foam stripes act as guidance, protection and fixation at the same time. Furthermore, the at least one hollow duct element is preferably at least partly formed using polyvinylidene fluoride and, thus, comparatively stable and strong by itself. This allows forming the at least one hollow duct element during installation and inserting it in position into the at least one hollow beam element. Furthermore, a respective cross sectional design of the blow molded composite structure and the at least one hollow polyvinylidene fluoride duct element can be changed into any shape as required.

Advantageously, the at least one hollow duct element in the at least one hollow beam element allows to fully use available space inside a blow molded composite structure for transporting isolated hot and/or cold air therethrough. In particular, the at least one hollow duct element in the at least one hollow beam element can be used instead of spacing that alternative air duct routings, such as dedicated flexible hoses, tubes and/or pipes, would require. This saves an otherwise required application of linings, as well as product weight and cost.

According to a further preferred embodiment, the at least one protective spacer is attached to the tubular duct element wall.

According to a further preferred embodiment, the at least one protective spacer is attached to the at least one hollow beam element.

According to a further preferred embodiment, the at least one hollow beam element comprises at least first and second wall members, which are rigidly attached to each other.

According to a further preferred embodiment, the at least first and second wall members are rigidly attached to each other via associated plate-shaped elements.

According to a further preferred embodiment, the at least one protective spacer is attached to one of the associated plate-shaped elements.

According to a further preferred embodiment, the at least one protective spacer comprises a polyethylene foam, in particular a closed-cell polyethylene foam.

According to a further preferred embodiment, the at least one protective spacer is a foam stripe.

Such foam stripes are cost-efficient and advantageously allow fixation of the at least one hollow duct element in the at least one hollow beam element. They can either be fixed on the at least one hollow duct element and/or on an inner side of the at least one hollow beam element.

According to a further preferred embodiment, the tubular duct element wall comprises polyvinylidene fluoride.

According to a further preferred embodiment, the at least one hollow duct element is adapted for guiding ventilation air in the aircraft.

Advantageously, the at least one hollow duct can usually be routed using shortest available distances in the fuselage. Thus, an underlying performance of a corresponding ventilation system that may include an environmental control system or an air-conditioning system can be improved.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
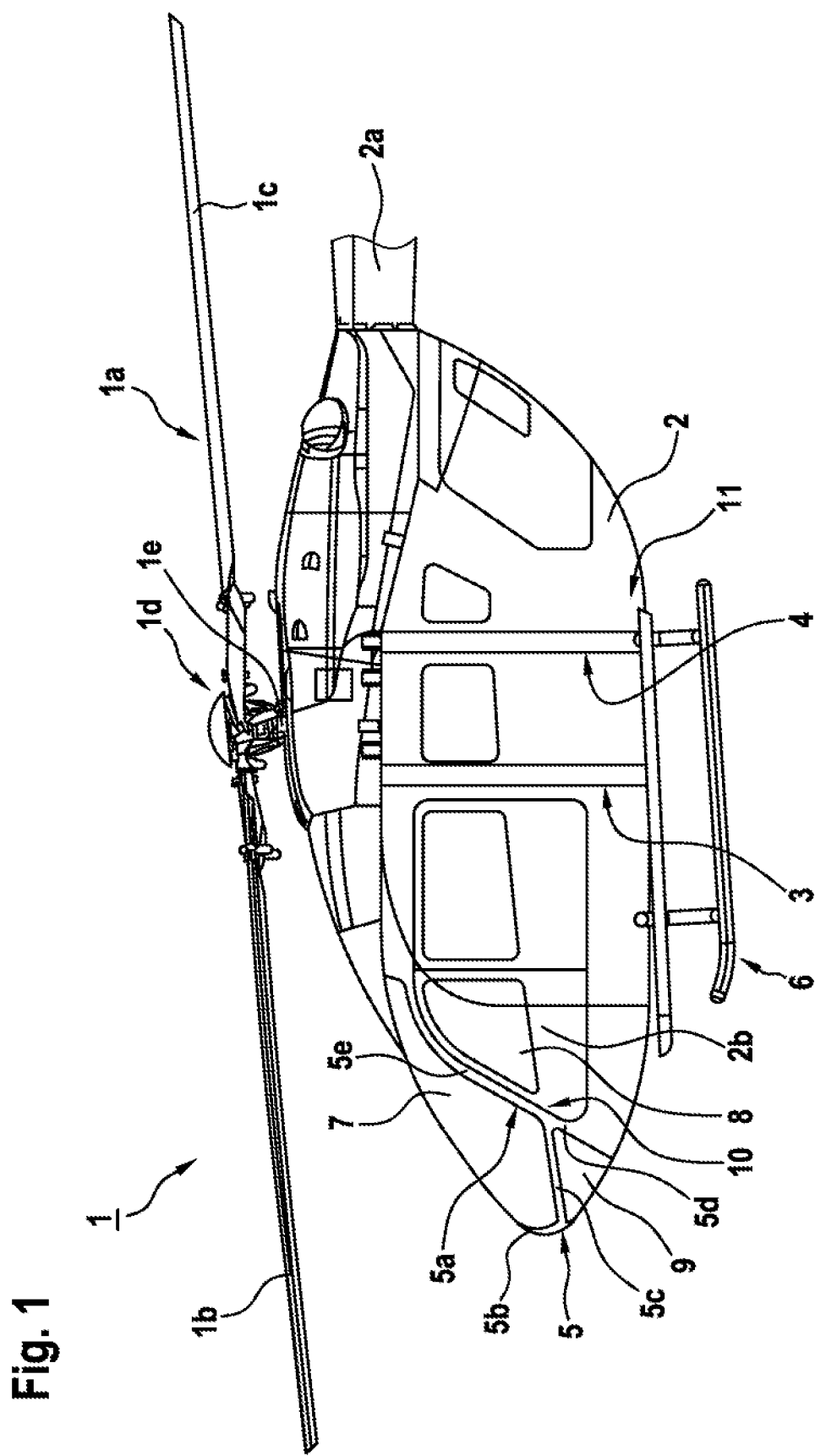
FIG. 1 shows a side view of an aircraft with a framework structure having at least one hollow beam element according to the invention.

FIG. 1 shows an aircraft 1 according to one aspect of the invention, which comprises a fuselage 2 having a framework structure 5 with at least one hollow frame 5a. Illustratively, the fuselage 2 is connected to a landing gear 6 and defines, by way of example, at least a tail boom 2a and a cockpit 2b. For simplicity and clarity of the drawings, the tail boom 2a is cut away and not shown in greater detail.

The aircraft 1 is exemplarily embodied as a rotary-wing aircraft and, in particular, as a helicopter. Therefore, the aircraft 1 is also referred to hereinafter as the "helicopter 1" for simplicity and clarity. It should, however, be noted that the present invention is not limited to helicopters and can likewise be applied to other aircrafts having a fuselage that comprises a framework structure with at least one hollow frame according to the invention. Moreover, other vehicles than aircrafts with such framework structures are also contemplated.

The helicopter 1 illustratively comprises at least one multi-blade main rotor 1a for providing lift and forward or backward thrust during operation. The at least one multi-blade main rotor 1a comprises a plurality of rotor blades 1b, 1c that are mounted at an associated rotor head 1d to a rotor shaft 1e, which rotates in operation of the helicopter 1 around an associated rotor axis.

Furthermore, the helicopter 1 may comprise one or more counter-torque devices configured to provide counter-torque during operation, i. e. to counter the torque created by rotation of the at least one multi-blade main rotor 1a for purposes of balancing the helicopter 1 in terms of yaw. The at least one counter-torque device can be provided at the tail boom 2a, which may further be provided e. g. with a horizontal stabilizer, a bumper, a tail wing and/or a fin.

According to one aspect, the fuselage 2 defines a subfloor region 11 of the helicopter 1, which may accommodate fuel cells, electrical installations, air ducts and so on. The fuselage 2 preferably comprises at least three interconnected fuselage frames: a fuselage mid section frame 3, a fuselage aft section frame 4 and a fuselage front section frame. The latter is implemented by the at least one hollow frame 5a and defines the framework structure 5 at least partly.

The framework structure 5 preferably and illustratively defines at least a cockpit framework structure and is, therefore, hereinafter also referred to as the "cockpit framework structure 5" for simplicity and clarity. Accordingly, the at least one hollow frame 5a preferably and illustratively defines at least a cockpit frame and is, therefore, hereinafter also referred to as the "hollow cockpit frame 5a" for simplicity and clarity. However, the present invention is not limited to an application to cockpit framework structures and frames and can likewise be applied to other hollow frames of an aircraft's fuselage.

The hollow cockpit frame 5a is preferably connected to a door frame 10 and adapted to accommodate at least one main window 7. The hollow cockpit frame 5a may further be adapted to accommodate one or more secondary windows 9. The door frame 10 is preferably adapted to accommodate at least one door window 8.

According to one aspect, the hollow cockpit frame 5a comprises one or more frame beams 5b, 5c, 5d, 5e. These frame beams 5b, 5c, 5d, 5e are interconnected during manufacturing such that the hollow cockpit frame 5a is integrally formed in one piece. In other words, the hollow cockpit frame 5a is manufactured as one single element that cannot be split into two or more parts in a non-destructive manner. Therefore, in the following any reference to the individual frame beams 5b, 5c, 5d, 5e is avoided for clarity and reference is only made to the hollow cockpit frame 5a as a single piece or component.

Preferably, the hollow cockpit frame 5a is entirely made of fiber composites in a fiber production process, preferably a blow molding process, and described by individual cross sections that are adapted to withstand the stress and load which will occur during the helicopter's lifetime. Preferentially, the fiber composites comprise carbon fiber reinforced polymers. Alternatively, or additionally, the fiber composites may comprise glass fiber reinforced polymers, basalt fiber reinforced polymers, aramid fiber reinforced polymers and/or any other suitable fiber reinforced polymers that are applicable in aircraft construction.

The hollow cockpit frame 5a and, more generally, the cockpit framework structure 5 is a so-called "primary structure", which defines a load-bearing construction that is adapted to absorb forces acting thereon. As mentioned above, the cockpit framework structure 5 and, more particularly, the hollow cockpit frame 5a comprises a hollow cross-section and usually does not fulfil any other function than the force absorption.

Figure 2:
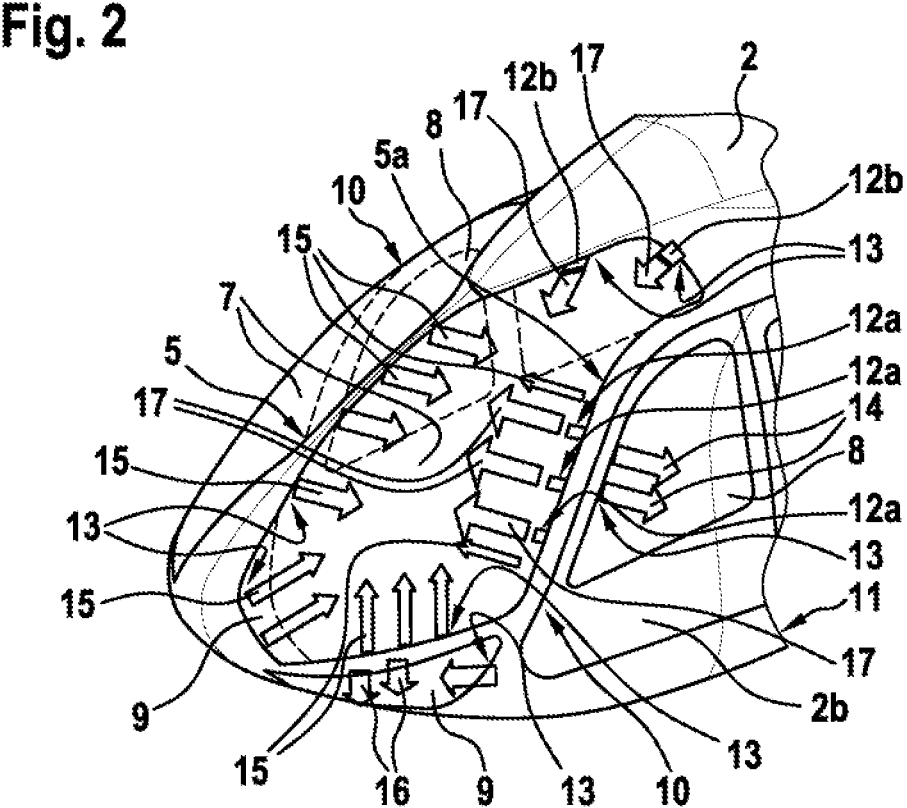
FIG. 2 shows a first perspective view of the framework structure of FIG. 1.

FIG. 2 shows a section of the fuselage 2 of FIG. 1 for illustrating the cockpit framework structure 5 with the hollow cockpit frame 5a, which defines the cockpit 2b of the helicopter 1 of FIG. 1, in greater detail. Illustratively, the hollow cockpit frame 5a is connected to two opposite door frames 10 and accommodates two main windows 7 and two secondary windows 9, while each door frame 10 accommodates an associated door window 8.

According to one aspect, at least the hollow cockpit frame 5a is adapted for guiding ventilation air 15, 16, 17 into the helicopter 1 of FIG. 1 in operation and, more specifically, at least into the cockpit 2b. Since the entire cockpit framework structure 5, i. e. the entire hollow cockpit frame 5a, is defined by hollow cross-sections, this ventilation air 15, 16, 17 can be ducted into all regions of the cockpit framework structure 5 and, more generally, of the fuselage 2 in order to provide air to all desired locations of the helicopter 1 of FIG. 1. Preferably, the hollow cross-sections of the cockpit framework structure 5 are essentially rectangular.

The cockpit framework structure 5 and, more specifically, the hollow cockpit frame 5a comprises preferably at least one and preferentially a plurality of ventilation air outlets 13 that are each adapted for expelling said ventilation air 15, 16, 17 in operation. Illustratively, main window ventilation air 15 is expelled onto the main windows 7 in operation, secondary window ventilation air 16 is expelled onto the secondary windows 9 in operation and pilot ventilation air 17 is expelled in the direction of a presumed pilot location in operation.

Preferably, at least one of the ventilation air outlets 13 is implemented as a simple opening or a hole provided in the hollow cockpit frame 5a, as a static nozzle, i. e. a fixedly targeted nozzle, or as an adjustable nozzle. By way of example, the ventilation air outlets 13 that expel the main window ventilation air 15 and the secondary window ventilation air 16 are implemented as openings or holes and/or as static nozzles.

However, since pilots vary in size and preference, they may need an adjustment in air expelling velocity and direction. Accordingly, the ventilation air outlets 13 that expel the pilot ventilation air 17 are preferably implemented as adjustable nozzles 12a, 12b provided e. g. on a side and on top of the main window 7. These adjustable nozzles 12a, 12b are preferably sealingly integrated into the hollow cockpit frame 5a by means of screwing, gluing and/or bonding and are adapted for user-controlled expellation of the pilot ventilation air 17.

It should be noted that expelling of ventilation air was described above only with reference to the hollow cockpit frame 5a. However, ventilation air can also be expelled from the door frames 10 as well as any other door frame and/or from the fuselage mid section frame 3 and/or the fuselage aft section frame 4 of FIG. 1. By way of example, at least one of the door frames 10 is provided with ventilation air outlets 13 that expel door window ventilation air 14 onto the associated door window 8 in operation.

Figure 3:
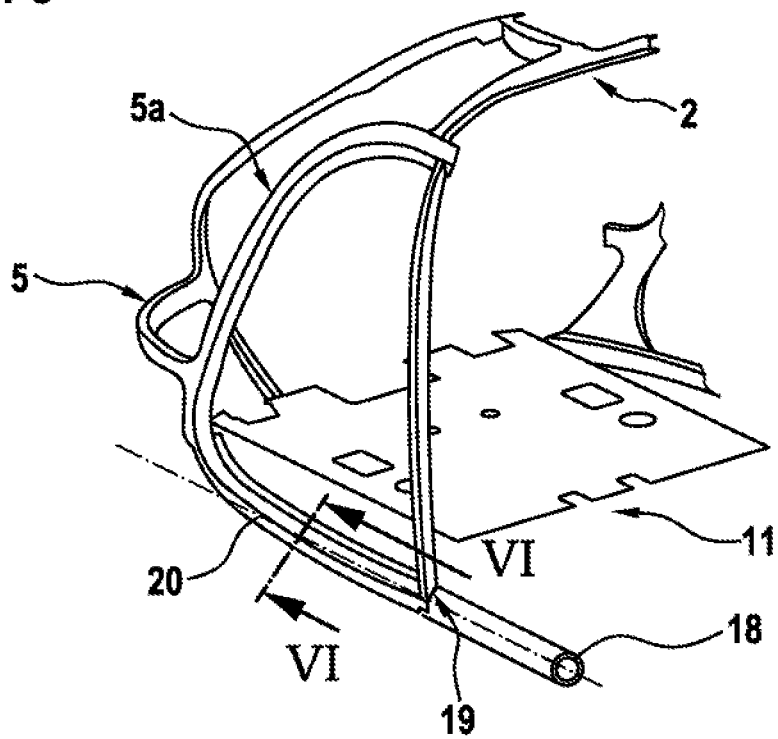
FIG. 3 shows a perspective view of a section of the framework structure of FIG. 1 with a hollow beam element according to the invention.

FIG. 3 shows a section of the fuselage 2 of FIG. 1 and FIG. 2 for further illustrating the subfloor region 11 and the cockpit framework structure 5 with the hollow cockpit frame 5a. The hollow cockpit frame 5a is integrally formed in one piece, as described above.

According to one aspect, the hollow cockpit frame 5a and, more specifically, a hollow beam element 20 thereof, is connected to a longitudinal frame integrated duct 18 provided in the subfloor region 11 by means of a suitable air duct interface 19. Thus, ventilation air that is generated e. g. by an air generating machine positioned in an aft section of the helicopter 1 of FIG. 1 can be supplied to the hollow cockpit frame 5a.

It should be noted that the hollow cockpit frame 5a illustratively comprises a single hollow beam element, i. e. the hollow beam element 20. However, more generally one or more of the individual frame beams 5b, 5c, 5d, 5e of FIG. 1 that constitute the hollow cockpit frame 5a may likewise be implemented as a hollow beam element, so that the hollow cockpit frame 5a is considered as comprising at least one hollow beam element. Accordingly, only the hollow beam element 20 is representatively described hereinafter.

Figure 4:
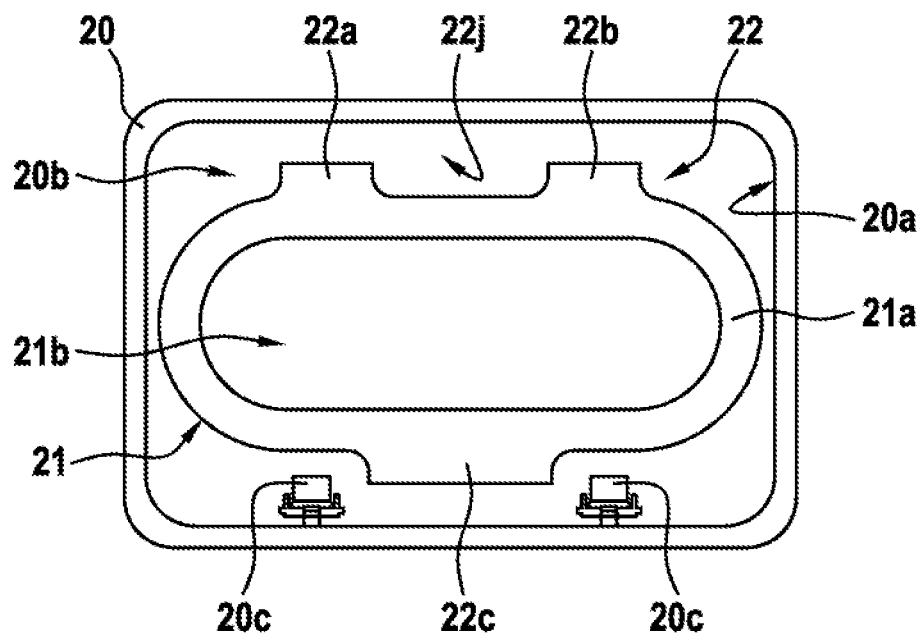
FIG. 4 shows a sectional view of the hollow beam element of FIG. 3, seen along section line IV-IV of FIG. 3, which is equipped with a hollow duct element according to the invention.

FIG. 4 shows the hollow beam element 20 of FIG. 3. Preferably, the hollow beam element 20 is a blow molded composite structure that is integrally formed as a single piece.

Illustratively, the hollow beam element 20 is defined by a continuous beam element wall 20a, which is created by means of blow molding and delimits an interior space 20b. Only illustratively, the hollow beam element 20 exhibits a rectangular cross section with chamfered or rounded edges. However, multiple other cross sections may likewise be implemented, such as e. g. circular, oval, polygonal etc.

According to one aspect, the hollow beam element 20 accommodates at least one hollow duct element 21 having a duct element wall 21a that is preferentially tubular. By way of example, the at least one hollow duct element 21 exhibits a basic cross section that is illustratively oval. However, any other basic cross section, such as e. g. circular or polygonal, is likewise contemplated. Preferably, the at least one hollow duct element 21 resp. its tubular duct element wall 21a comprises polyvinylidene fluoride (PVDF).

Illustratively, only a single hollow duct element 21 is accommodated in the hollow beam element 20. This hollow duct element 21 is preferably adapted for guiding ventilation air, such as the ventilation air 14, 15, 16, 17 of FIG. 2, in a corresponding aircraft, e. g. the aircraft 1 of FIG. 1, so that the guided ventilation air is isolated such that energy losses can at least be reduced. Therefore, the hollow duct element 21, i. e. its tabular duct element wall 21a, preferentially defines a duct interior space 21b.

It should be noted that use of the hollow duct element 21 for guiding ventilation air is only described by way of example and not for limiting the present invention accordingly. Instead, the hollow duct element 21 may be used for other purposes, such as e.g. guidance of air data routings, guidance of electrical wiring, guidance of hydraulic pipes and so on. Advantageously, by using the hollow duct element 21 for guidance of air data routings or electrical wiring, the latter can be protected against chaffing and or wear damage. By using the hollow duct element 21 for guidance of hydraulic routings, the latter can advantageously either be protected or more easily installed and fixed.

According to one aspect, at least one and, by way of example, three protective spacers 22a, 22b, 22c are arranged between the hollow duct element 21 and the hollow beam element 20. More specifically, the three protective spacers 22a, 22b, 22c are arranged between the tubular duct element wall 21a, and the continuous beam element wall 20a.

Preferably, at least one and, preferentially, each one of the protective spacers 22a, 22b, 22c comprises PVDF.

The protective spacers 22a, 22b, 22c exemplarily define a plurality of protective spacers 22, which is preferably arranged between the hollow duct element 21 and the hollow beam element 20 such that free space 22j is available between the tubular duct element wall 21a and the hollow beam element 20. The free space 22j is preferably provided such that objects/obstacles that are located in the interior space 20b of the hollow beam element 20, such as resin residues due to the blow molding of the hollow beam element 20 or, e. g., fixation members 20c for fixation of objects to the hollow beam element 20, are located within this free space 22j.

According to one aspect, the tubular duct element wall 21a and the protective spacers 22a, 22b, 22c are integrally formed as a single piece. Preferably, at least one and, illustratively, each one of the protective spacers 22a, 22b, 22c is provided as an external, i. e. outwardly oriented protrusion of the tubular duct element wall 21a. In other words, the protective spacers 22a, 22b, 22c are an integral part of the hollow duct element 21 and implemented as outwardly oriented protrusions with respect to the oval basis cross section of the hollow duct element 21.

Figure 5:
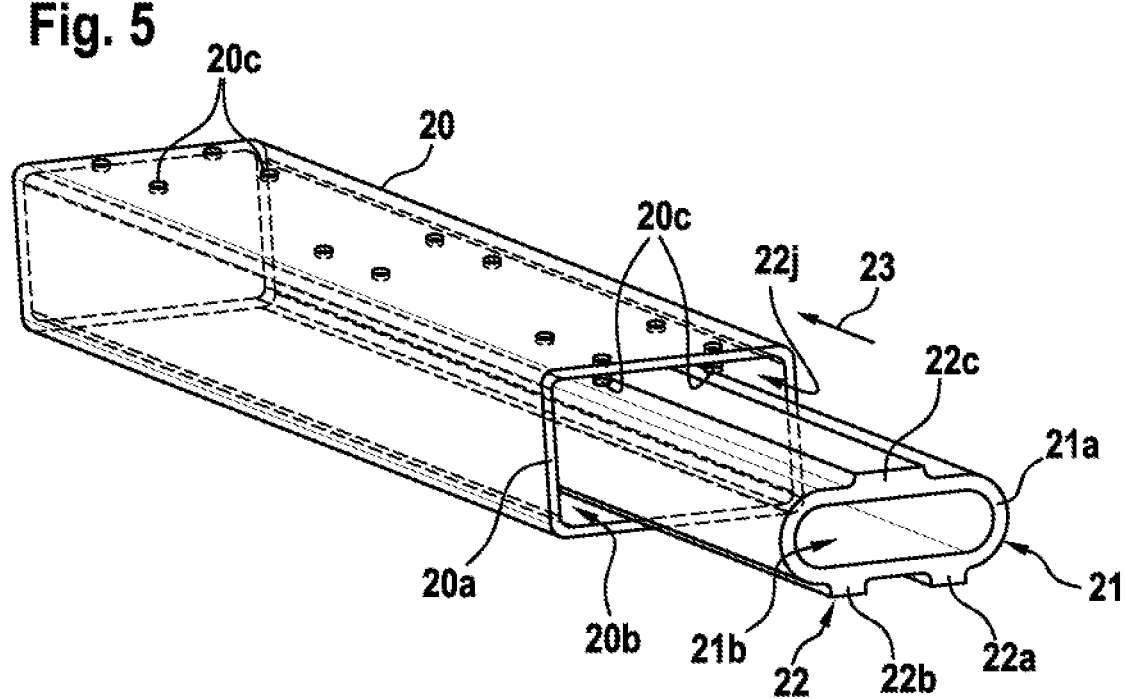
FIG. 5 shows a perspective view of the hollow beam element and the hollow duct element of FIG. 4 during insertion of the hollow duct element into the hollow beam element.

FIG. 5 shows the hollow beam element 20 with the beam element wall 20a of FIG. 4 and the hollow duct element 21 with the tubular duct element wall 21a of FIG. 4 during mounting of the hollow duct element 21 to the hollow beam element 20. Therefore, the hollow duct element 21, which is equipped with the plurality of protective spacers 22 of FIG. 4, i. e. the protective spacers 22a, 22b, 22c of FIG. 4, is exemplarily introduced resp. pushed into the hollow beam element 20 in an exemplary mounting direction 23 such that any fixation members 20c of FIG. 4 are located in the free space 22j of FIG. 4, which is created between the tubular duct element wall 21a and the hollow beam element 20.

It should be noted, however, that the above described pushing of the hollow duct 21 into the hollow beam element 20 is only described by way of example and not for limiting the invention accordingly. Instead, a pulling process using e. g. a pulling wire or other extension device may likewise be implemented and is, therefore, also contemplated.

More specifically, the hollow beam element 20 is exemplarily provided with a plurality of fixation members 20c, from which only four fixation members are labelled with the reference sign 20c, for simplicity and clarity of the drawings. Illustratively, the fixation members 20c are spaced apart in width direction of the hollow beam element 20, i. e. in a direction transverse to the mounting direction 23, by a distance that matches a corresponding width of the protective spacer 22c, which may thus be positioned and gliding between the fixation members 20c during mounting in the mounting direction 23 without touching the fixation members 20c.

Figure 6:
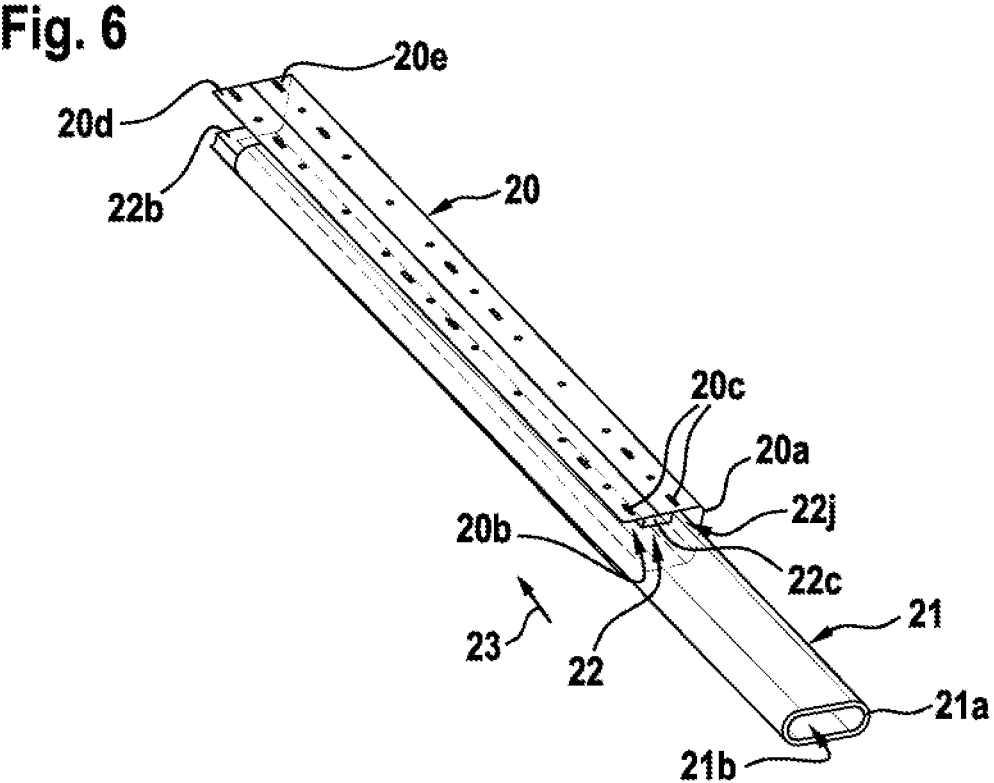
FIG. 6 shows a perspective view of the hollow beam element and the hollow duct element of FIG. 5, which are embodied according to a variant, wherein the hollow beam element is partly cut-off.

FIG. 6 shows the hollow beam element 20 with the beam element wall 20a of FIG. 4, the hollow duct element 21 with the tubular duct element wall 21a of FIG. 4, and the plurality of protective spacers 22 of FIG. 4 during mounting of the hollow duct element 21 to the hollow beam element 20. However, the hollow beam element 20 and the hollow duct element 21 are now embodied according to another aspect of the present invention, as described hereinafter.

More specifically, in contrast to FIG. 4, the hollow beam element 20 now preferably comprises at least first and second wall members 20d, 20e, which are rigidly attached to each other, as described in more detail below with reference to FIG. 7. Illustratively, a first wall member 20d and a second wall member 20e are provided, both of which are preferably at least approximately C-shaped.

However, it should be noted that the first and second C-shaped wall members 20d, 20e are only described by way of example and not for limiting the invention accordingly. Instead, more than two components may be used for implementing the hollow beam element 20 and the shaping of each one of these components can e. g. be determined in an application-specific manner with respect to predefined requirements dependent on a respective use and installation location of the hollow beam element 20.

Furthermore, also in contrast to FIG. 4, the hollow duct element 21 and the plurality of spacers 22 are now implemented as separate components. In other words, the hollow duct element 21 now exemplarily only exhibits its oval basic cross section without any outwardly oriented protrusions that define the plurality of protective spacers 22 as described above with reference to FIG. 4. Instead, the plurality of protective spacers 22, from which only the protective spacers 22b, 22c are visible, are now preferably implemented as stripe-shaped elements that are, preferentially, attached to the hollow beam element 20.

Figure 7:
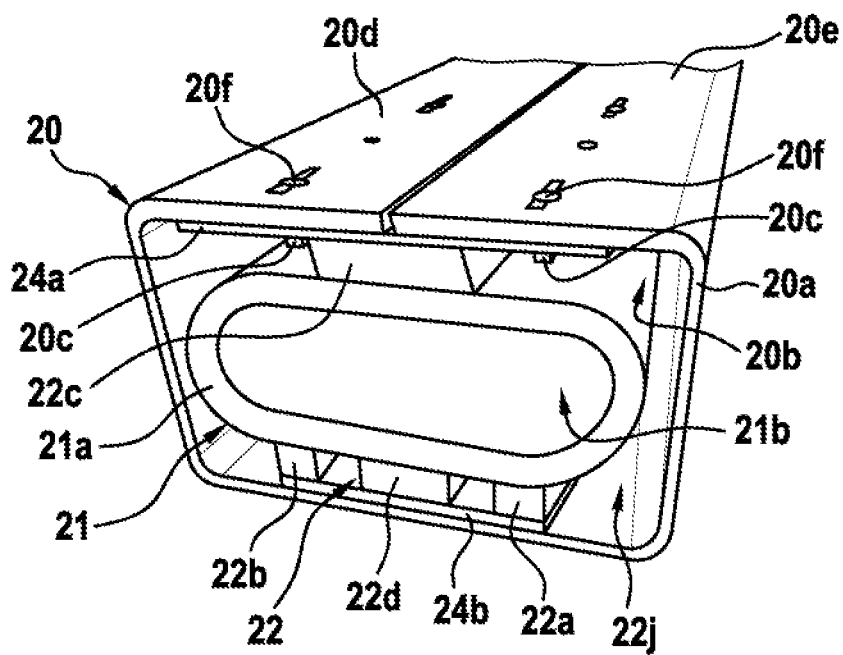
FIG. 7 shows a perspective view of the hollow beam element and the hollow duct element of FIG. 6, as well as protective spacers after insertion of the hollow duct element into the hollow beam element.

FIG. 7 shows the hollow beam element 20 with the first and second C-shaped wall members 20d, 20e of FIG. 6, the hollow duct element 21 with the tubular duct element wall 21a of FIG. 6, and the plurality of protective spacers 22 with the protective spacers 22b, 22c of FIG. 6, which now also comprise the protective spacer 22a of FIG. 4 and an additional protective spacer 22d.

According to one aspect, the first and second C-shaped wall members 20d, 20e are rigidly attached to each other via associated plate-shaped elements 24a, 24b. By way of example, the associated plate-shaped elements 24a, 24b are rigidly attached to the first and second C-shaped wall members 20d, 20e at associated locations 20f by means of the fixation members 20c of FIG. 4.

It should be noted that the associated locations 20f and the fixation members 20c are preferably arranged all over an axial length of the hollow beam element 20 resp. the plate-shaped elements 24a, 24b, preferentially in a predefined pattern. However, for simplicity and clarity of the drawings only two associated locations 20f and only two fixation members 20c are respectively labelled and only with reference to the plate-shaped element 24a.

According to one aspect, the plate-shaped elements 24a, 24b are provided with the protective spacers 22a, 22b, 22c, 22d, which are now preferably implemented as stripe-shaped elements as described above with reference to FIG. 6. The stripe-shaped protective spacers 22a, 22b, 22c, 22d are preferably respectively attached to one of the plate-shaped elements 24a, 24b and, thus, to the hollow beam element 20. For instance, the stripe-shaped protective spacer 22c is bonded or glued to the plate-shaped element 24a and the stripe-shaped protective spacers 22a, 22b, 22d are bonded or glued to the plate-shaped element 24b.

Preferably, at least one and, preferentially, each one of the protective spacers 22a, 22b, 22c, 22d comprises a polyethylene foam, in particular a closed-cell polyethylene foam. Accordingly, the protective spacers are preferably implemented as foam stripes.

Figure 8:
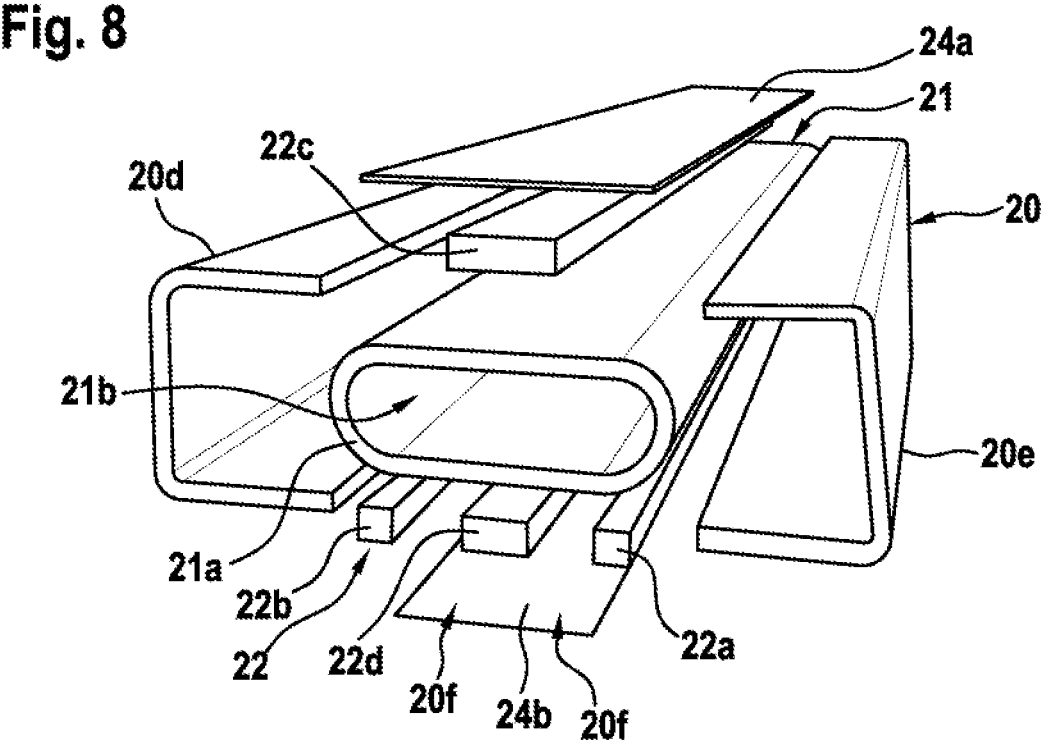
FIG. 8 shows an exploded view of the hollow beam element, the hollow duct element and the protective spacers of FIG. 7.

FIG. 8 shows the hollow beam element 20 with the first and second C-shaped wall members 20d, 20e of FIG. 7, the hollow duct element 21 with the tubular duct element wall 21a of FIG. 7, the plurality of protective spacers 22 with the stripe-shaped protective spacers 22a, 22b, 22c, 22d of FIG. 7, and the plate-shaped elements 24a, 24b of FIG. 7. By way of example, the C-shaped form of the C-shaped wall members 20d, 20e, the stripe-shaped form of the stripe-shaped protective spacers 22a, 22b, 22c, 22d, and the plate-shaped form of the plate-shaped elements 24a, 24b are further illustrated.

Figure 9:
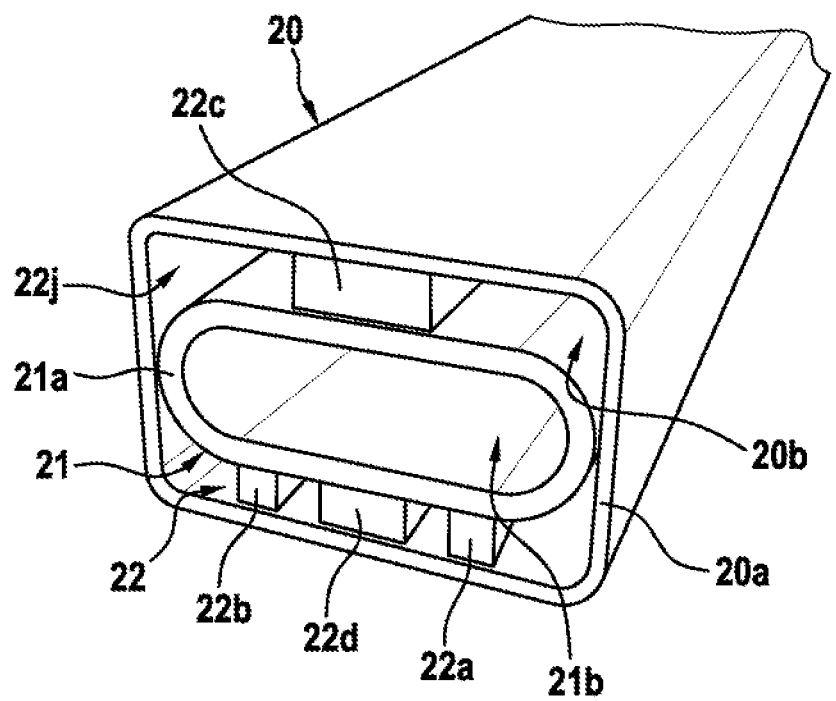
FIG. 9 shows a perspective view of the hollow beam element of FIG. 5 with the hollow duct element and the protective spacers of FIG. 7.

FIG. 9 shows the hollow beam element 20 of FIG. 7, the hollow duct element 21 with the tubular duct element wall 21a of FIG. 7, and the plurality of protective spacers 22 with the stripe-shaped protective spacers 22a, 22b, 22c, 22d of FIG. 7. However, the hollow beam element 20 is now exemplarily again embodied as described above with reference to FIG. 4. In other words, instead of being provided with the first and second C-shaped wall members 20d, 20e of FIG. 7, the hollow beam element 20 is again provided with the continuous beam element wall 20a of FIG. 4, which is created by means of blow molding and delimits the interior space 20b of FIG. 4, so that provision of the plate-shaped elements 24a, 24b of FIG. 7 can be omitted.

In contrast to FIG. 7, at least one and, preferentially, all stripe-shaped protective spacers 22a, 22b, 22c, 22 are now attached to the tubular duct element wall 21a of the hollow duct element 21 instead of the hollow beam element 20, resp. the plate-shaped elements 24a, 24b of FIG. 7. Preferably, the stripe-shaped protective spacers 22a, 22b, 22c, 22d are bonded or glued to the tubular duct element wall 21a.

Figure 10:
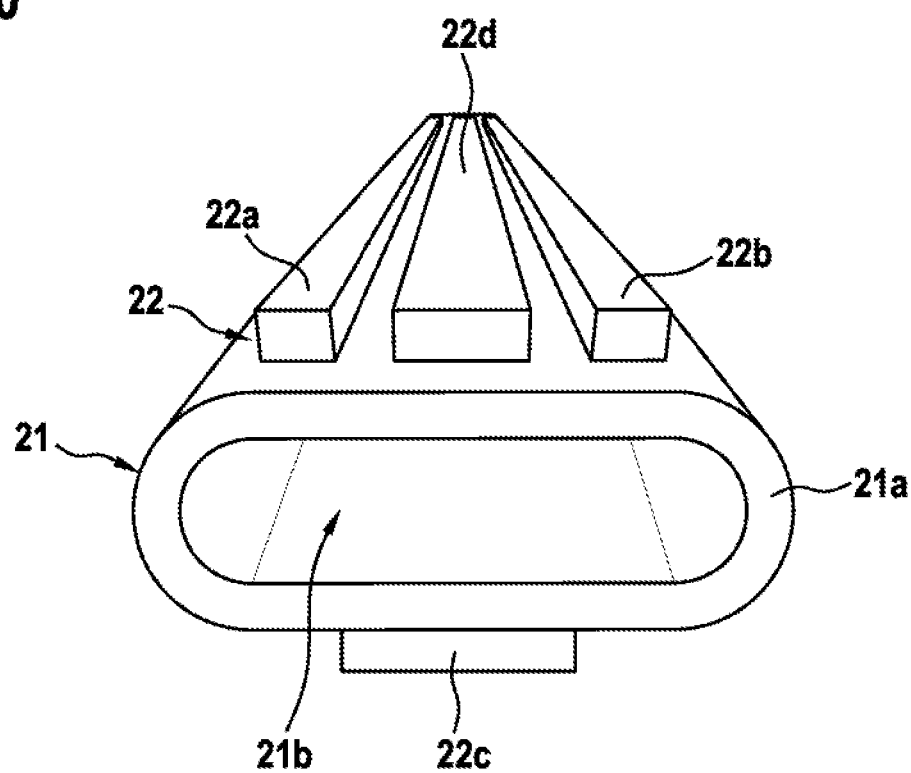
FIG. 10 shows a perspective view of the hollow duct element and the protective spacers of FIG. 9.

FIG. 10 shows the hollow duct element 21 with the tubular duct element wall 21a of FIG. 9 and the plurality of protective spacers 22 with the protective spacers 22a, 22b, 22c, 22d of FIG. 9. As described above with reference to FIG. 9, the stripe-shaped protective spacers 22a, 22b, 22c, 22d are preferably bonded or glued to the tubular duct element wall 21a.

Figure 11:
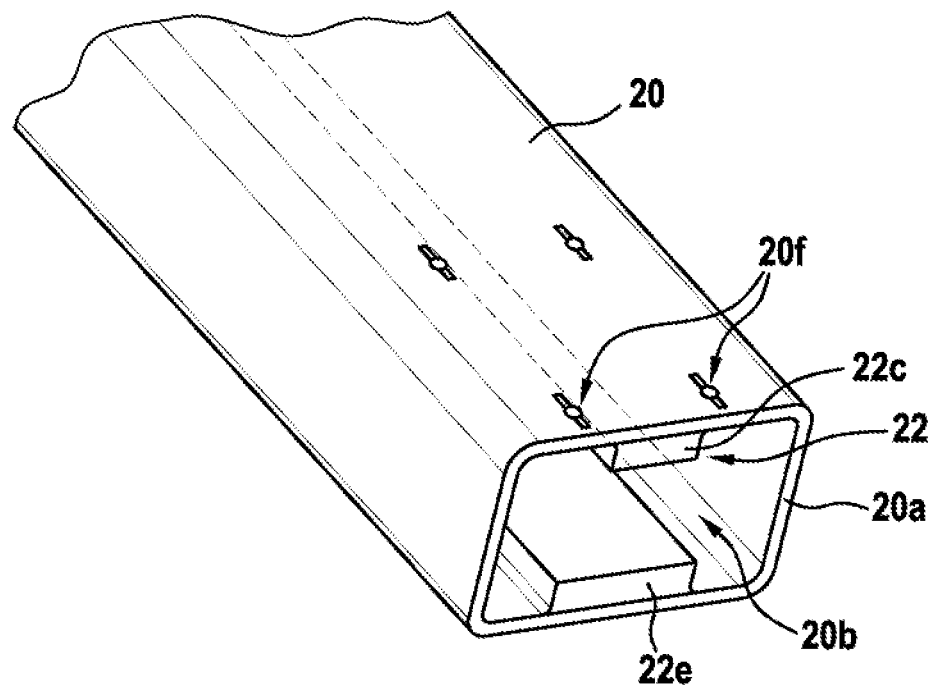
FIG. 11 shows the hollow duct element of FIG. 5 with protective spacers according to a variant.

FIG. 11 shows the hollow beam element 20 with the continuous beam element wall 20a of FIG. 9, and the plurality of protective spacers 22 of FIG. 9, which now exemplarily only comprises the stripe-shaped protective spacer 22c of FIG. 9 and an additional stripe-shaped protective spacer 22e. According to one aspect, the stripe-shaped protective spacers 22c, 22e are now, however, attached to the hollow beam element 20, resp. to the continuous beam element wall 20a, e. g. by means of bonding or gluing.

Figure 12:
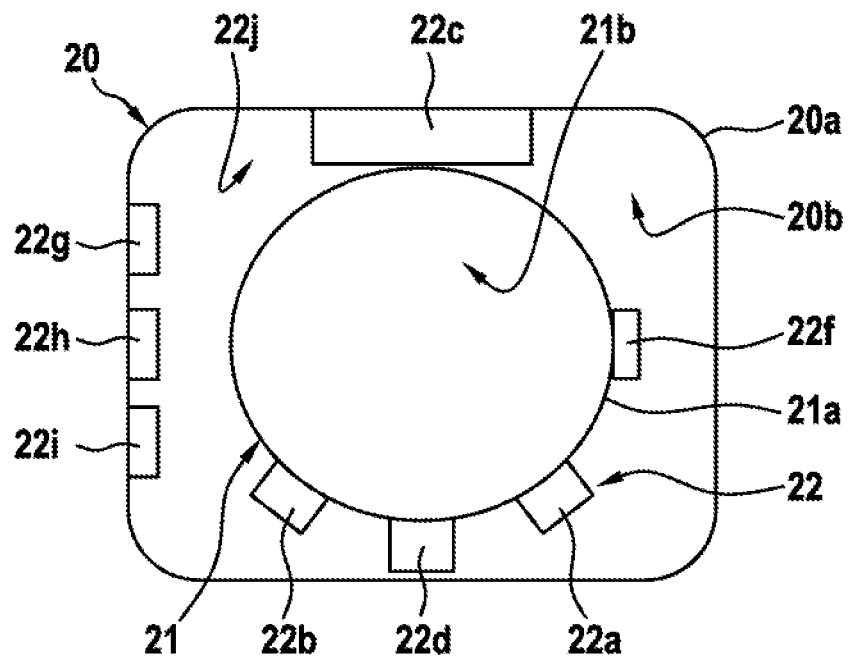
FIG. 12 shows a front view of the hollow beam element of FIG. 5 with the hollow duct element of FIG. 7 and different variants of protective spacers.

FIG. 12 shows the hollow beam element 20 schematically, which can be implemented according to any one of FIG. 4 to FIG. 9 or FIG. 11. Furthermore, FIG. 12 shows the hollow duct element 21, which can be implemented according to any one of FIG. 4 to FIG. 11 and which only illustratively exhibits a circular basic cross section. Moreover, FIG. 12 shows the plurality of protective spacers 22 of the preceding figures, for illustrating possible mounting locations thereof.

More specifically, the plurality of protective spacers 22 exemplarily comprises eight protective spacers 22a, 22b, 22c, 22d, 22f, 22g, 22h, 22i. According to one aspect, all protective spacers 22a, 22b, 22c, 22d, 22f, 22g, 22h, 22i or arbitrary subsets thereof can be used with the hollow beam element 20 and the hollow duct element 21 according to the present invention.

For instance, only the protective spacers 22a, 22b, 22c can be implemented and provided as described above with reference to FIG. 4 to FIG. 10. In other words, they can either be attached to the hollow beam element 20 or the hollow duct element 21.

Alternatively, only the protective spacers 22a, 22b can be attached to the hollow duct element 21, while the protective spacer 22c is attached to the hollow beam element 20. However, the protective spacers 22a, 22b can also be implemented as integral parts of the hollow duct element 21, as described above with reference to FIG. 4 and FIG. 5, while the protective spacer 22c is implemented as a stripe-shaped protective spacer that is attached to the hollow beam element 20, as described above with reference to FIG. 6 and FIG. 11, or vice versa.

Still alternatively, only the protective spacers 22a, 22b, 22c, 22d can be implemented as stripe-shaped protective spacers, as described above with reference to FIG. 7 to FIG. 10. However, the protective spacers 22a, 22b, 22d can be attached to the hollow duct element 21, as described above with reference to FIG. 10, while the protective spacer 22c is attached to the hollow beam element 20, as described above with reference to FIG. 6 and FIG. 11, or vice versa.

Other alternative mounting locations are likewise contemplated, as exemplarily illustrated with the protective spacers 22f, 22g, 22h, 22i. By way of example, they are laterally arranged with respect to the hollow duct element 21 and either attached to the hollow beam element 20 or the hollow duct element 21. Alternatively, they may also be provided on a single side of the hollow duct element 21, and so on.

Figure 13:
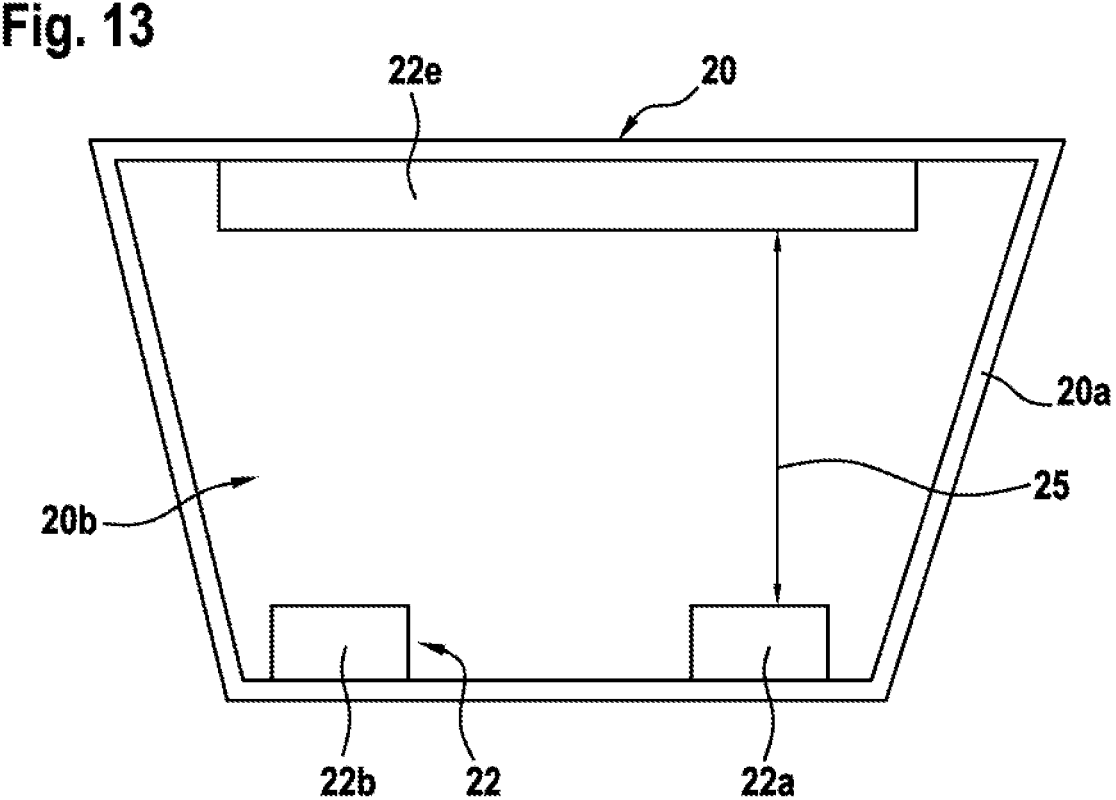
FIG. 13 shows a front view of the hollow duct element and the protective spacers of FIG. 11.

FIG. 13 shows the hollow beam element 20 schematically, which can be implemented according to any one of FIG. 4 to FIG. 9, FIG. 11 or FIG. 12, and which only exemplarily exhibits a trapezoidal cross section. Furthermore, also only by way of example, the hollow beam element 20 is provided with the protective spacers 22a, 22b of FIG. 8 and the protective spacer 22e of FIG. 11, which are attached to the hollow beam element 20.

FIG. 13 illustrates a preferred hollow duct element height 25 according to the present invention. Accordingly, the hollow duct element 21 of FIG. 6 to FIG. 9 preferably exhibits a height that corresponds to the preferred hollow duct element height 25, preferably for enabling at least within predetermined manufacturing tolerances a 0 mm fit, such that introduction of the hollow duct element 21 of FIG. 6 to FIG. 9 into the hollow beam element 20 is easily and quickly possible without the introduction being hindered by the protective spacers 22a, 22b, 22e.

However, the hollow duct element 21 of FIG. 6 to FIG. 9 may also exhibit a height that is slightly greater than the preferred hollow duct element height 25, e. g. +5 mm, such that some pressure on the installed hollow duct element 21 of FIG. 6 to FIG. 9 can be created. Thus, it can better and easier be kept in place.

It should be noted that modifications to the above described embodiments are within the common knowledge of the person skilled in the art and, thus, also considered as being part of the present invention. For instance, not only different implementations of the inventive protective spacers are contemplated, as described above with reference to FIG. 4 and FIG. 5 as well as FIG. 6 to FIG. 11, but also combinations thereof, as described above with reference to FIG. 12. Furthermore, not only various different mounting locations of the inventive protective spacers are contemplated, as described above with reference to FIG. 12, but these various different mounting locations may also be selected and determined in an application-specific manner, e. g. dependent on respective locations of resin residues, rivets and/or anchor nuts in respective hollow beam elements, as far as they can be detected or predetermined. Moreover, the protective spacers must not be provided over an entire length of the hollow duct element according to the present invention, but may also only be provided in sections. Also, the hollow beam element described above may not only be implemented as a composite structure, but also other materials may be applied, such as e. g. metal, and so on.

It should further be noted that the above description essentially describes the present invention with reference to the hollow cockpit frame. However, the present invention may likewise be applied to other hollow frames and/or framework structures in any aircraft, and even in other vehicles than aircrafts.

Moreover, it should be noted that only straight hollow beam elements and straight hollow duct elements are described with reference to FIG. 4 to FIG. 13. However, alternative shapings are likewise contemplated. For instance, the hollow beam element may be bended or twisted. In this case, it might be advisable to pre-form the hollow duct element in order to simplify its mounting to the hollow beam element and for acquiring an enhanced fit thereto.

Finally, it should be noted that the protective spacers are described as protecting the hollow duct element during mounting to the hollow beam element with respect to resin residues, rivets and/or anchor nuts that may be present in the hollow beam element. However, the protective spacers are advantageously also suitable to simplify a temporary disassembly of the hollow duct element and the hollow beam element, if e. g. repairing of rivets and/or anchor nuts is required.

REFERENCE LIST 1 aircraft
1a main rotor
1b, 1c rotor blades
1d rotor head
1e rotor shaft
2 fuselage
2a tail boom
2b cockpit
3 fuselage mid section frame
4 fuselage aft section frame
5 cockpit framework structure
5a fuselage front section frame (cockpit frame)
5b, 5c, 5d, 5e cockpit frame beams
6 landing gear
7 main window
8 door window
9 secondary window
10 door frame
11 subfloor region
12a adjustable side nozzles
12b adjustable top nozzles
13 air outlets
14 door window ventilation air
15 main window ventilation air
16 secondary window ventilation air
17 pilot ventilation air
18 longitudinal frame integrated duct
19 air duct interface
20 hollow beam element
20a beam element wall
20b structure interior space
20c fixation members
20d, 20e C-shaped wall members
20f fixation member locations
21 hollow duct element
21a tubular duct element wall
21b duct element interior space
22 plurality of protective spacers
22a, 22b, 22c, 22d, 22e, 22f, 22g, 22h, 22i protective spacers
22j free space
23 mounting direction
24a, 24b splice plates
25 preferred hollow duct element height

What is claimed is:

1. An aircraft with a fuselage, the fuselage comprising at least one hollow beam element, wherein the at least one hollow beam element accommodates at least one hollow duct element that comprises a tubular duct element wall, wherein at least one protective spacer is arranged between the tubular duct element wall and the at least one hollow beam element such that free space is available between the tubular duct element wall and the at least one hollow beam element.

2. The aircraft according to claim 1,
wherein the tubular duct element wall and the at least one protective spacer are integrally formed as a single piece.

3. The aircraft according to claim 2,
wherein at least the tubular duct element wall comprises polyvinylidene fluoride.

4. The aircraft according to claim 3,
wherein the at least one protective spacer comprises polyvinylidene fluoride.

5. The aircraft according to claim 2,
wherein the at least one protective spacer is provided as an external protrusion of the tubular duct element wall.

6. The aircraft according to claim 2,
wherein the at least one hollow beam element is a blow molded composite structure that is integrally formed as a single piece.

7. The aircraft according to claim 1,
wherein the at least one protective spacer is attached to the tubular duct element wall.

8. The aircraft according to claim 1,
wherein the at least one protective spacer is attached to the at least one hollow beam element.

9. The aircraft according to claim 8,
wherein the at least one hollow beam element comprises at least first and second wall members, which are rigidly attached to each other.

10. The aircraft according to claim 9,
wherein the at least first and second wall members are rigidly attached to each other via associated plate-shaped elements.

11. The aircraft according to claim 10,
wherein the at least one protective spacer is attached to one of the associated plate-shaped elements.

12. The aircraft according to claim 1,
wherein the at least one protective spacer comprises a polyethylene foam.

13. The aircraft according to claim 12,
wherein the at least one protective spacer is a foam stripe.

14. The aircraft according to claim 12,
wherein the tubular duct element wall comprises polyvinylidene fluoride.

15. The aircraft according to claim 1,
wherein the at least one hollow duct element is adapted for guiding ventilation air in the aircraft.

16. The aircraft according to claim 1,
wherein the at least one protective spacer comprises a closed-cell polyethylene foam.

17. An aircraft comprising a fuselage, the fuselage comprising a hollow beam, the hollow beam accommodating a hollow duct comprising a tubular duct wall, wherein a protective spacer is disposed between the tubular duct wall and the hollow beam such that free space is between the tubular duct element and the hollow beam.

18. The aircraft according to claim 17,
wherein the tubular duct wall is made of a polymeric material.

19. The aircraft according to claim 17,
wherein the protective spacer is made of a polymeric material.

20. An aircraft comprising a fuselage, the fuselage having a hollow beam, the hollow beam accommodating a hollow duct comprising a tubular duct wall and a plurality of solid protective spacers spaced from each other and disposed between the tubular duct wall and the hollow beam such that a plurality of free spaces extend between the tubular duct wall and the hollow beam.

\* \* \* \* \*